United States Patent [19]
Adler et al.

[11] Patent Number: 5,946,370
[45] Date of Patent: Aug. 31, 1999

[54] SYSTEM AND METHOD FOR ACCESSING THE THREE-DIMENSIONAL GEOMETRY OF LARGE OBJECTS USING X-RAY BASED METHOD SUBJECT TO LIMITATIONS ON RADIATION DOSES

[75] Inventors: Roy Lee Adler, Chappaqua; Nogah Haramati, New Rochelle; Alan David Kalvin, Irvington; Joseph Y. Margulies, Armonk; Charles P. Tresser, Mamaroneck; Chai Wah Wu, Ossining, all of N.Y.

[73] Assignee: International Business Machines Corporation, Armonk, N.Y.

[21] Appl. No.: 09/062,276

[22] Filed: Apr. 15, 1998

[51] Int. Cl.⁶ ........................................... A61B 6/03
[52] U.S. Cl. ........................... 378/4; 378/901; 382/132
[58] Field of Search ......................... 378/4, 8, 901; 382/131, 132

[56] References Cited

U.S. PATENT DOCUMENTS 5,891,030  4/1999  Johnson et al. ........................ 600/407

Primary Examiner—David Vernon Bruce
Attorney, Agent, or Firm—Whitham, Curtis & Whitham; Louis J. Percello

[57] ABSTRACT

A computer system and method solve the problem of getting a useful three dimensional representation of an object like the spine using a small amount of data. This is done by gathering and combining three dimensional data in the form of computer tomography (CT) scans of a patient's bones with two dimensional data consisting of CT scout images (or scouts), which are digital two dimensional X-ray images that can be produced by a CT scanner. The main features of spinal deformation are captured by combining the two dimensional data from CT scouts and the three-dimensional information from the CT scans using simple modeling of vertebrae. Scouts are usually used to monitor CT scan acquisition. Here, they are also used as an essential source of data.

4 Claims, 7 Drawing Sheets

SYSTEM AND METHOD FOR ACCESSING THE THREE-DIMENSIONAL GEOMETRY OF LARGE OBJECTS USING X-RAY BASED METHOD SUBJECT TO LIMITATIONS ON RADIATION DOSES

BACKGROUND OF THE INVENTION

1. Field of the Invention

The present invention generally relates to the field of computer image processing of computer tomography (CT) data and, more particularly, to a system and method for accessing the three-dimensional geometry of large objects using X-ray based methods subject to limitations on radiation doses.

2. Background Description

U.S. Pat. No. 5,416,815, which is incorporated here by reference in its entirety, describes computer tomography (CT) systems and the method of image reconstruction from projections.

The usefulness of getting three dimensional representations of objects under study has long been recognized, in particular, in medicine. Several techniques, more or less invasive, have been developed which allow three dimensional data acquisition. The present invention addresses the case when data acquisition techniques are so invasive that their use has to be minimized. Thus, one has to rely on a limited amount of information gathering to construct a useful three dimensional rendering of the object of study.

Although the principles disclosed here are applicable to quite general settings, medical or otherwise, we will concentrate on the study of the spine of patients afflicted with idiopathic scoliosis. Idiopathic scoliosis is a condition which affects a very large bone structure, the spine. Since X-ray analysis is commonly used in the study of bones (Magnetic Resonance Imaging (MRI) and other non-invasive techniques lack the kind of precision one needs for several purposes like the analysis of scoliosis), the size of the spine and the limited amount of X-ray that a patient can withstand forbid fine X-ray computer tomography (CT) scanning as a method to get a three dimensional representation. Furthermore, the evolutive nature of the condition implies that examinations have to be frequently repeated, with accumulative radiation hazard, which is another reason to look for small doses of radiations in the process of data acquisition.

Idiopathic scoliosis is a little understood disease. It is a progressive three dimensional (3-D) deformation of the spine involving curvature and torsion which affects about 3% of adolescents, one fifth of whom require extensive medical testing to determine whether dramatic and dangerous surgery will be required. A general reference on scoliosis can be found in *Moe's Textbook of Scoliosis and Other Spinal Deformities* by John E. Lonstein, David S. Bradford, Robert B. Winter and James Ogilvie, 3rd edition, W. B. Saunders & Co., 1995. Many authors have tried to explain the possible etiology of scoliosis. The term "idiopathic", means "different suffering" in Greek: "idiopathic scoliosis" has the sense of "enigmatic scoliosis".

Scoliosis, in general, is a major deformity that involves practically the whole musculo-skeletal system, and probably other systems as well. Attempts to explain the phenomenon have led to some nosological successes in which a minority of patients have been diagnosed as suffering from something other than idiopathic scoliosis. For that disease, however, the mystery remains. How can a major pathological process that changes practically the whole body go unexplained, with an undetected source? This comprises probably one of the most fascinating enigmas of medicine.

Severe scoliosis leads to one of the grandest surgical procedures known to medicine. The primary goal of surgery is to prevent further deterioration, the secondary one is to correct the deformity as much as is still possible. Spinal fusion is the current treatment. It has absolutely nothing to do with the basic etiology and pathophysiology of the disease and does not attempt to treat its cause. It is a crude mechanical approach which can often lead to subsequent problems. Nevertheless, until a better solution is found, it is the best option.

Problems to be Solved

The spine is an extremely complex object consisting of twenty-four vertebrae, which are themselves complicated objects, separated by disks. One must get a simpler geometric representation of the full spine which will capture the essential aspects of the three-dimensional information involved in idiopathic scoliosis. In the present disclosure we shall provide a mean of obtaining a wire-frame like approximation to the vertebral bodies and their relative positions from radiological data. The result will allow the practitioner to obtain all the measurements available in previous art as well as a better understanding of the three-dimensional deformation of the spine.

Several authors have reported on difficulties associated with data acquisition and processing and representing the deviation of a pathological spine from a healthy one. These difficulties are two-fold:

1) On one hand, there is the unavoidable need to get as much information as possible, using methods both reliable and as uninvasive as possible. Unbearably heavy doses of radiation would be needed to obtain sufficient information for reasonable calculations with most present time approaches, e.g., high resolution CT scans, while other modes of imaging like MRI or ultra sounds are inherently not accurate enough for the problem at hand.

2) On the other hand, we want to avoid the inaccuracy induced by the conventional X-ray based measurements, which depend on two-dimensional projections of a three dimensional deformity on a celluloid sheet. Some of the difficulties in this category are somehow artificial resulting from lack of universally accepted protocol of measurement (see, e.g., W. Skalli, F. Lavaste, and J. L. Descrimes, "Quantification of three-dimensional vertbral rotations in scoliosis: what are the true values?", *Spine,* 20 (1995), 546–553). The basic problem here is the inconsistency in definition of parameters of the deformed vertebrae on the two dimensional display. Reference measurement points on the vertebrae, needed for calculations of correction, are ambiguously describable as reported for instance in references B. Drerup, "Improvement in measuring vertebral rotations from the projections of the pedicles", *J. Biomechanics,* 18 (1985), 369–378, B. Xion, B. Sevastik, J. Sevastik, R. Hedlund, I. Suliman, and S. Kristjansson, "Horizontal plane morphometry of normal and scoliotic vertebrae", *Eur.Spine J.,* 4 (1995), 6–10, T. Kojima and T. Kurokawa, "Quantification of three-dimensional deformity of idiopathic scoliosis", *Spine,* 17 (1992), S22–S29, and H. Labelle, J. Dansereau, C. Bellefleur, and J. S. Jéquier, "Variability of geometric measurements from three dimensional reconstructions of scoliotic spines and rib cages", *Eur. Spine J.*, 4 (1995), 88–94.

SUMMARY OF THE INVENTION

It is therefore an object of the present invention to provide a system and method to solve the problem of getting useful three dimensional representation of an object like the spine using a small amount of data.

We solve this problem by gathering and combining three dimensional data in the form of CT scans of a patient's bones with two dimensional data consisting of CT scout images (or scouts). Scouts are digital two dimensional X-ray images that can be produced by a CT scanner. An alternative to scouts would be to use digitized classical X-ray images. In the test case of spinal examination of patients afflicted by idiopathic scoliosis, we can capture the main features of the spinal deformation by combining the two dimensional data from CT scouts and the three-dimensional information from the CT scans using simple modeling of vertebrae. Scouts are usually used to monitor CT scan acquisition. We use them also as an essential source of data.

More particularly, according to the invention, to solve problem 1), we use a combination of CT scan scout views, and a selection of very few CT scan cuts to acquire data (scouts are X-rays taken in a CT scan machine: they are less invasive than usual X-rays, and avoid most angular distortions). This is then combined with geometric modeling in order to get approximations of each vertebrae good enough for practitioners to work with (yet simple enough to later allow real time three-dimensional animation on screen). The most diseased vertebrae, usually the apical ones (an apical vertebrae is defined as the vertebrae on the apex of the spinal curve locally), will have finer models because they have more complicated shapes, and a bigger range of possible shapes than the healthier ones so that more precise data is needed to get a good picture of them. Notice that before proceeding to a modern operation, surgeons need fine CT scans of the apical vertebrae anyhow.

Regarding problem 2), although when a vertebra gets deformed, it is difficult to quantify how much it has moved out of its healthy position, we notice that the amount of internal vertebral deformation are irrelevant when it comes to quantify the difference between the pathological position and the planned surgical correction. Thus, instead of trying to get new disputable abstract parameters, this invention will provide a way to get a good geometric pictures of deformed vertebrae and the spine as a whole. The practitioner will still be able to extract conventional measurements such as the Cobb angle (see Cobb, J. R. "Outline for study of scoliosis", *American Academy of Orthopedics and Surgery*, vol. 7, pp. 160 et seq., 1948), but will not be limited to these very partial estimators of the disease.

Idiopathic scoliosis requires several examinations since it is an evolutive disease. By intertwining complete examinations with ones involving less data acquisition, the use of geometric modeling allows one to keep track of the evolution of the condition with more precision than with classical X-ray methods, but avoid as much as possible the high radiation level required for usual CT-scan based three-dimensional reconstruction.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
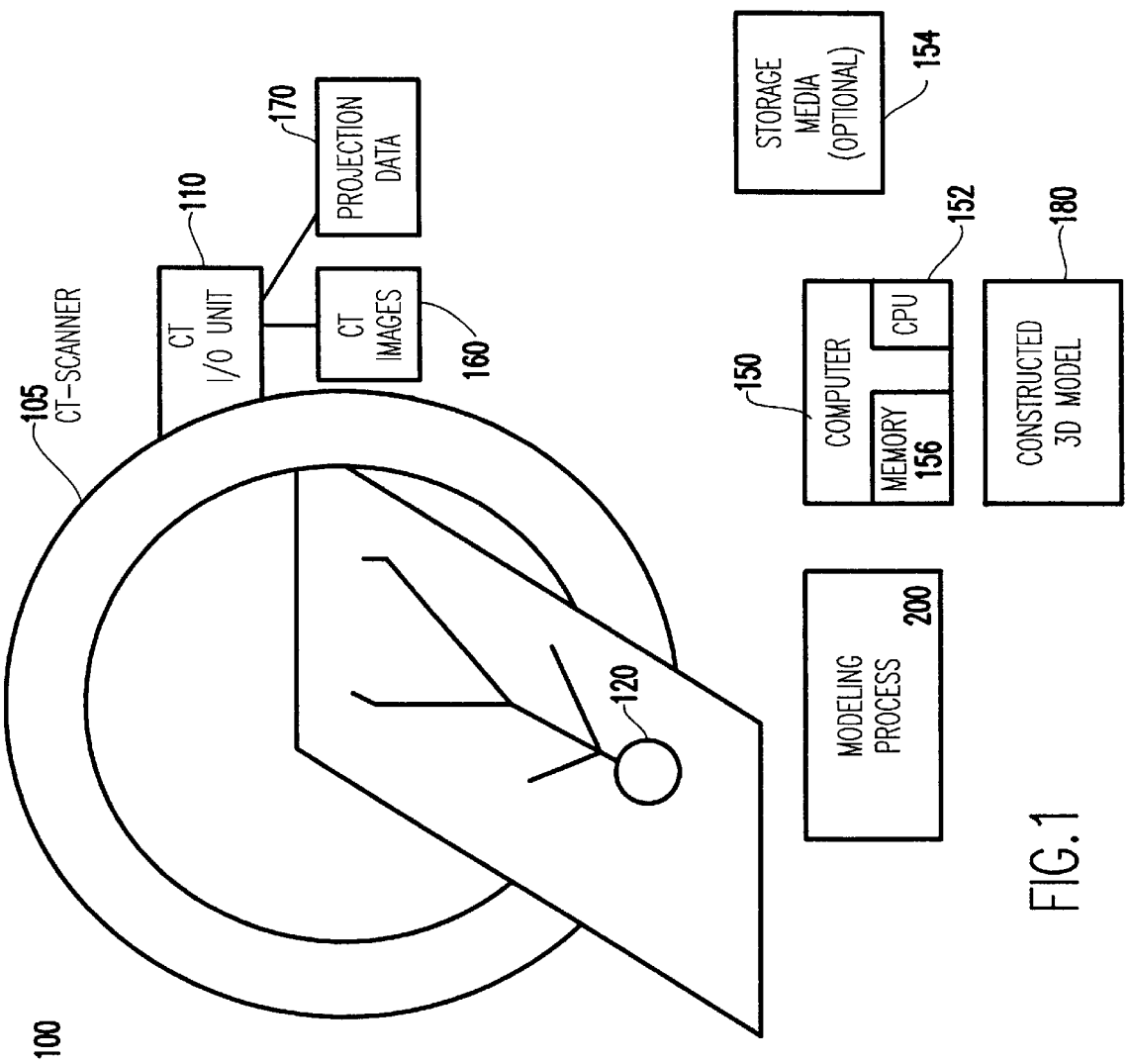
FIG. 1 is a block diagram of a computer tomography (CT) system using the present invention.

Referring now to the drawings, and more particularly to FIG. 1, there is shown one preferred embodiment of the present invention for accessing the three-dimensional geometry of large objects in computer tomography (CT) images 160 produced by a computed tomography scanner 105. A patient 120 is scanned by the CT scanner 105, collecting projection data 170 from the CT input/output (I/O) unit 110, from which is created a set of two-dimensional CT images 160. This process of creating the images 160 is known as image reconstruction from projections. The CT images 160 contain cross-sectional details of the scene that was scanned, which typically includes the patient 120.

The CT images 160 and the related CT projection data 170 are input to a computer 150 and, optionally, stored on an external storage medium 154. The computer 150 may be, for example, an IBM Risc System 6000 workstation running AIX, IBM's version of the UNIX operating system, and the external storage medium 154 may be, for example, a disk storage system connected to the computer. The computer 150 includes a central processing unit (CPU) 152 and memory 156. A geometric modeling program 200 stored in memory 156 running on CPU 152 of the computer 150 reads in the CT images 160 and projection data 170, and computes the constructed model of vertebra 180.

We now describe the full process of acquisition of three-dimensional data of a patient's spine. This data can easily be incorporated in a visualization tool such as IBM's Data Explorer. The resulting model provides a three-dimensional picture of the twenty-four vertebral bodies as they are located in space.

Intertwining Complete and Intermediate Examinations

If the problem of radiation doses could be ignored, the CT scan technology by itself would allow to obtain high accuracy of the three-dimensional geometry of the spine solely on the basis of techniques which are now of current use. We disclose here a method to get satisfactory geometric understanding of the (diseased) spine with far less radiation than the intolerable systematic CT scan exploration. Although our procedure involves quite reduced radiation doses, it is natural to aim at even less. While we use as little data as mathematically possible at this stage, further reductions will be possible in some cases, more reduction being expected as practitioners gather and exchange more and more data obtained by our method. To explain this, we need first to describe the typical examination plan.

In the case of timely detection, a patient would be examined every 6 months from ages 2 to 18, except during the about 2 years long growth spurt when examinations are made every 3 or 4 months. On the average, this amounts to thirty-five radiological examinations.

These examinations will be divided into two classes; the complete examinations and the intermediate examinations. In practice, there will be about eight complete examinations.

The complete examinations would involve our most extensive data acquisition. Based on the fact that the global spine geometry evolves faster than the individual vertebral shapes, the geometric models obtained from the data collected during the complete examinations will be used to get pictures of the spine from less data obtained during the intermediate examinations. The intermediate examinations are performed between the complete examinations. The two kinds of examinations are intertwined so that one always has a satisfactory representation both of the spine and of the individual vertebrae while using as little radiations as possible.

In the preferred embodiment of the invention, we use scouts (which could be replaced by traditional X-rays which would then need to be digitized). The use of CT scouts is preferable to that of classical X-rays for the following reasons:

(1) it involves far less radiation that usual X-rays thanks to the fact that the data are recorded by detectors instead of an emulsion on celluloid;

(2) the data are directly available in digital form;

(3) the geometrical distortion is mostly eliminated;

(4) at least one scout is needed anyhow for CT scans monitoring; and (5) the scouts are always mutually co-registered and are co-registered with the CT scans, where geometrical data A is co-registered with geometrical data B if they are acquired in the same reference frame.

The description of the collection of data in the preferred embodiment involves CT scan machines for supine patients as this is the current state of the art. This description would adapt readily to examinations where the patient is erect, as soon as such CT scan machines are available (the erect position might be preferable as it is closer to traditional examinations).

We will divide the vertebrae into two classes: deformed vertebrae and transitional vertebrae. Deformed vertebra consist of the apical vertebrae and those next to the apices, where the deviation from normality is not only in the solid motion in space, but also in the deformation of the bone structure. Transitional vertebrae deviate (if at all) from normality mainly by their solid displacement in space and present at most minor deformations of the bone structure.

Data to he Collected During Complete Examinations

We describe here the data to be collected during the complete examinations as defined above: there will usually be up to eight such examinations in the history of the patient.

D1 Four scouts, preferably positioned with respect to the patient at angles $\theta=0°$, $45°$, $90°$, $135°$, with $\theta=0°$ designating the frontal scout.

D2 Two CT cuts per transitional vertebra, at about one third and two thirds of the height.(However, one may suffice.)

D3 Several 1 millimeter (mm) thick CT cuts (as is commonly used for three-dimensional reconstruction) for deformed vertebrae.

Data to be Collected During Intermediate Examinations

We describe here the data to be collected during the intermediate examinations as defined above: there will usually be up to twenty-seven such examinations in the history of the patient.

D'1 Four scouts, preferably positioned with respect to the patient at angles $\theta=0°$, $45°$, $90°$, $135°$, with $\theta=0°$ designating the frontal scout.

Geometric Modeling Following Complete Examinations

In order to visualize a patient's spine in three dimensions it suffices to deal with only vertebral bodies which are much simpler than the entire vertebra. We now explain how to combine data from D1, D2, and D3 with the three-dimensional model obtained from complete examinations in order to get satisfactory three-dimensional models of the full spine and the individual vertebrae.

By locating a point in space, we mean determining its three spatial coordinates. The difficulty of the problem of locating points in space from X-rays stems from the very fact that X-rays are merely two-dimensional projections (with some mass information since accumulated mass increase brightness): in fact, the mathematical theory allowing us to obtain CT scan views also tells us that no point can be located from a medically acceptable number of traditional X-rays (forgetting radiation doses, one would need as many X-rays as rays recorded in a CT scan, and the subject should not move in between!). This impossibility can be partially overcome by inferring the recognizability of some test points on each vertebra, as in the method proposed by J. Dansereau and I. A. F. Stokes in "Measurements of the three-dimensional shape of the rib cage", *J. Biomechanics*, 21 (1988) 893–901 (there, X-rays taken at two different angles with the horizontal plane are used on standing patients), but automatic location in space is not accessible this way. Furthermore, such methods lead to errors of the same order of magnitude as more classical examinations, as reported in "Variability of geometric measurements from three-dimensional reconstruction of scoliotic spines and rib cages", *Eur. Spine J.*, 4 (1995) 88–94 by H. Labelle, J. Dansereau, C. Bellefleur, and J. C. Jéquier. The opposite is true for CT scans: all the points in a CT cut can be located in space.

Since many CT cuts are taken of deformed vertebrae, there is no difficulty in locating enough points of such an object to be able to render its three-dimensional position accurately in a visualization tool as is done in CT with current techniques. The problem is with the transitional vertebrae for which only two CT cuts and the scouts are available.

Figure 2:
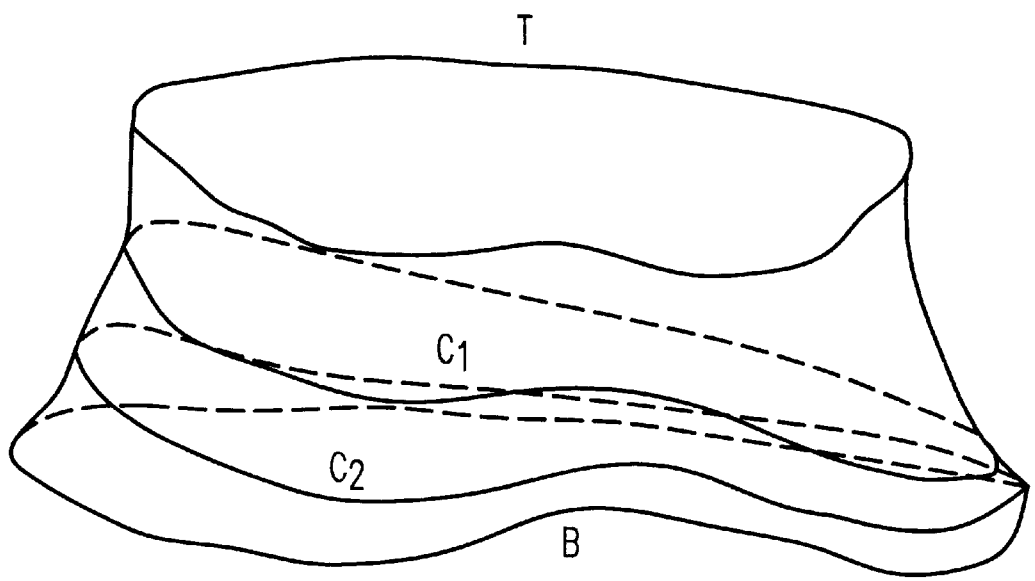
FIG. 2 is a three-dimensional representation of a vertebral body with two computer tomography scans.

Referring to FIG. 2, from a CT cut i we get a boundary curve whose points can be located in space. On the cut i, we can also identify the boundary curve $C^i$ of the body of the vertebra, using some interpolation at the level of the pedicules when the cut i is such that it intersects the location where the pedicules attach to the body. Here we assume that some vertebra has been chosen: i will take the values 1 and 2 to designate respectively cuts which are taken at about one third and two thirds of the height of the vertebra. Because of the position of the spine in the CT scan machine, these planes can be at undetermined angle with the top and bottom planes of the body of the vertebra (these planes are reasonably well defined in the case of a transitional vertebra).

The curves $C^i$ supply enough information so that, as we disclose here, the location of some other points can be determined from scouts even though scouts, like traditional X-rays, are only projections with some mass information.

Figure 3:
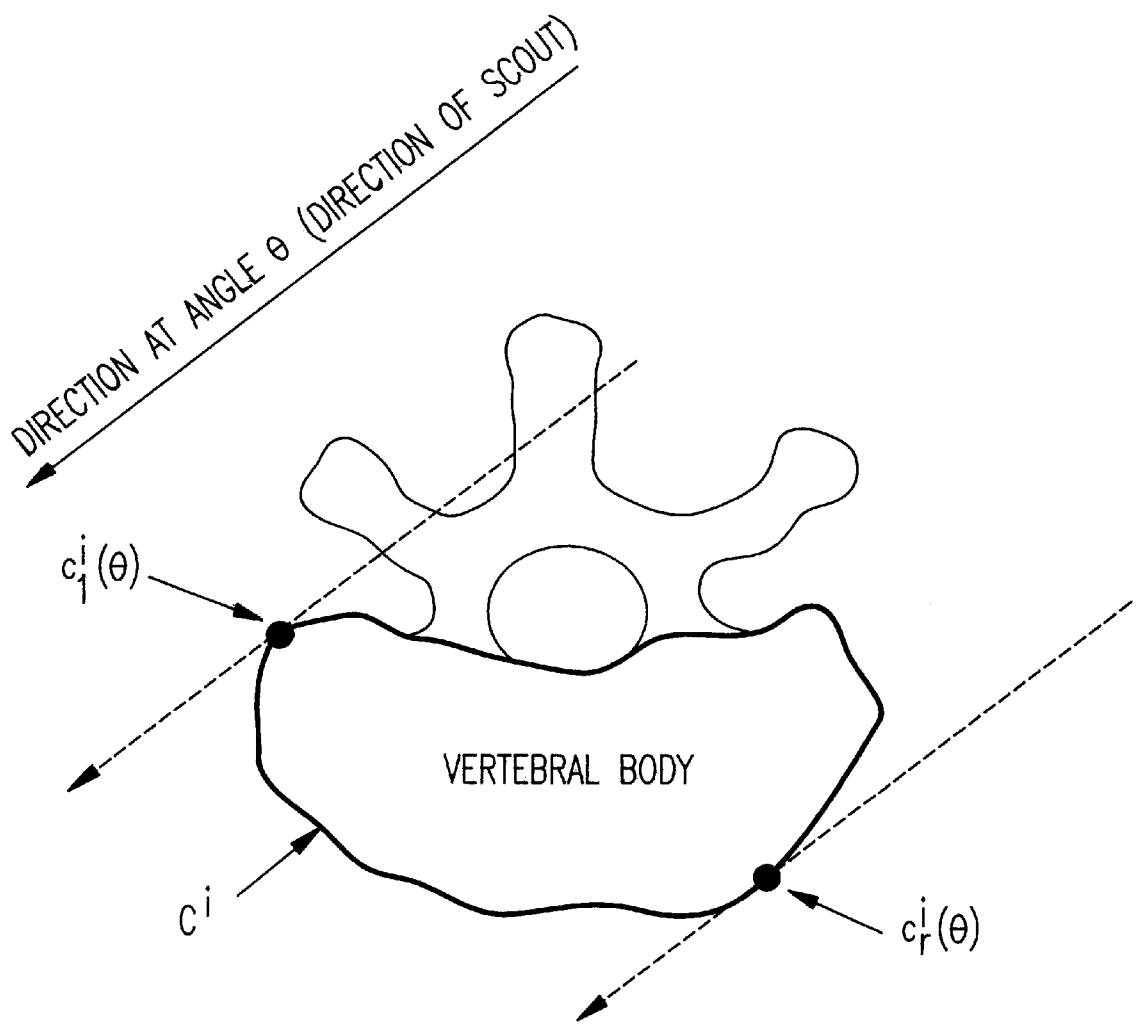
FIG. 3 is a schematic diagram of a computer tomography cut of a vertebra.

With reference to FIG. 3, in a CT scan i of a vertebra, the external points of the curve $C^i$, transversely to the direction with angle $\theta$, can be determined. We get two points that we denote by $c_l^i(\theta)$ for the left external point, and $c_r^i(\theta)$ for the right external point. In the region where the body of the vertebra attach to the posterior elements, these points might belong to a piece of $C^i$ obtained by interpolation.

Figure 4:
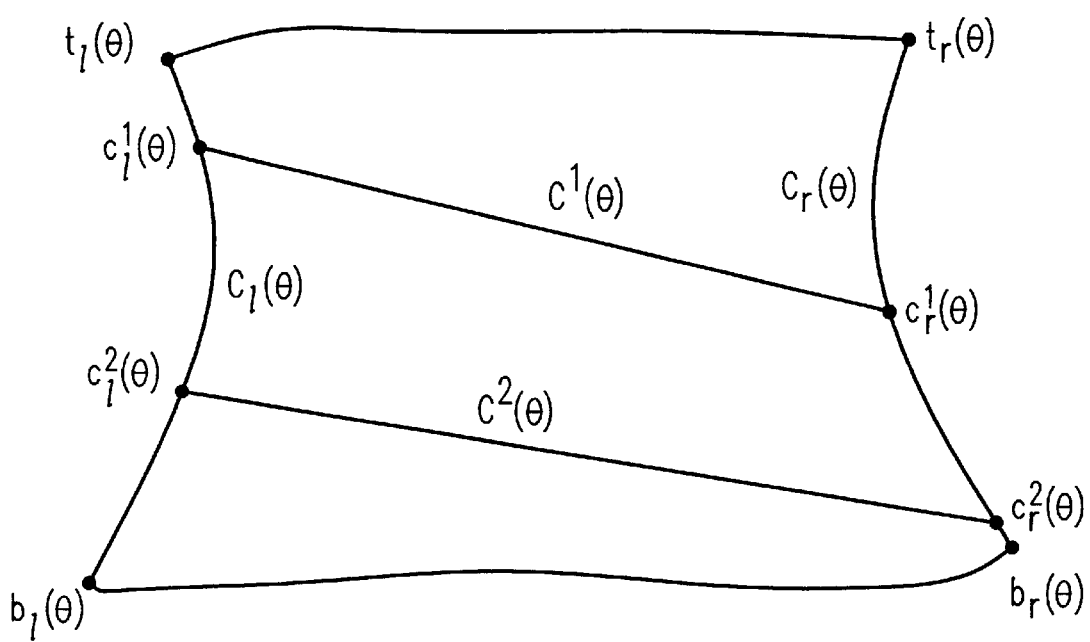
FIG. 4 is a scout view at angle θ.

We call P the plane which comes closest to contain the four points $c_l^1(\theta)$, $c_r^1(\theta)$, $c_l^2(\theta)$, and $c_r^2(\theta)$. With reference now to FIG. 4, we then define the external curves $C_r(\theta)$, $C_l(\theta)$ as the intersections of the plane P with the outside boundary of the vertebral body. For an transitional vertebra, at least one of these two curves projects to a recognizable edge of the projection of vertebral body on the scout at angle $\theta$. There will be at least five such curves projecting to a recognizable edge when considering all four values of $\theta$. Then, the data from the scout at angle $\theta$ together with the determination of the plane P determine the most likely three-dimensional location of at least one of the curves $C_r(\theta)$, $C_l(\theta)$ in space.

If for any transitional vertebra one has good reasons to believe that the plane P is reasonably well approximated by the vertical plane orthogonal to the direction determined by $\theta$, only one cut is needed for this transitional vertebra.

Figure 5:
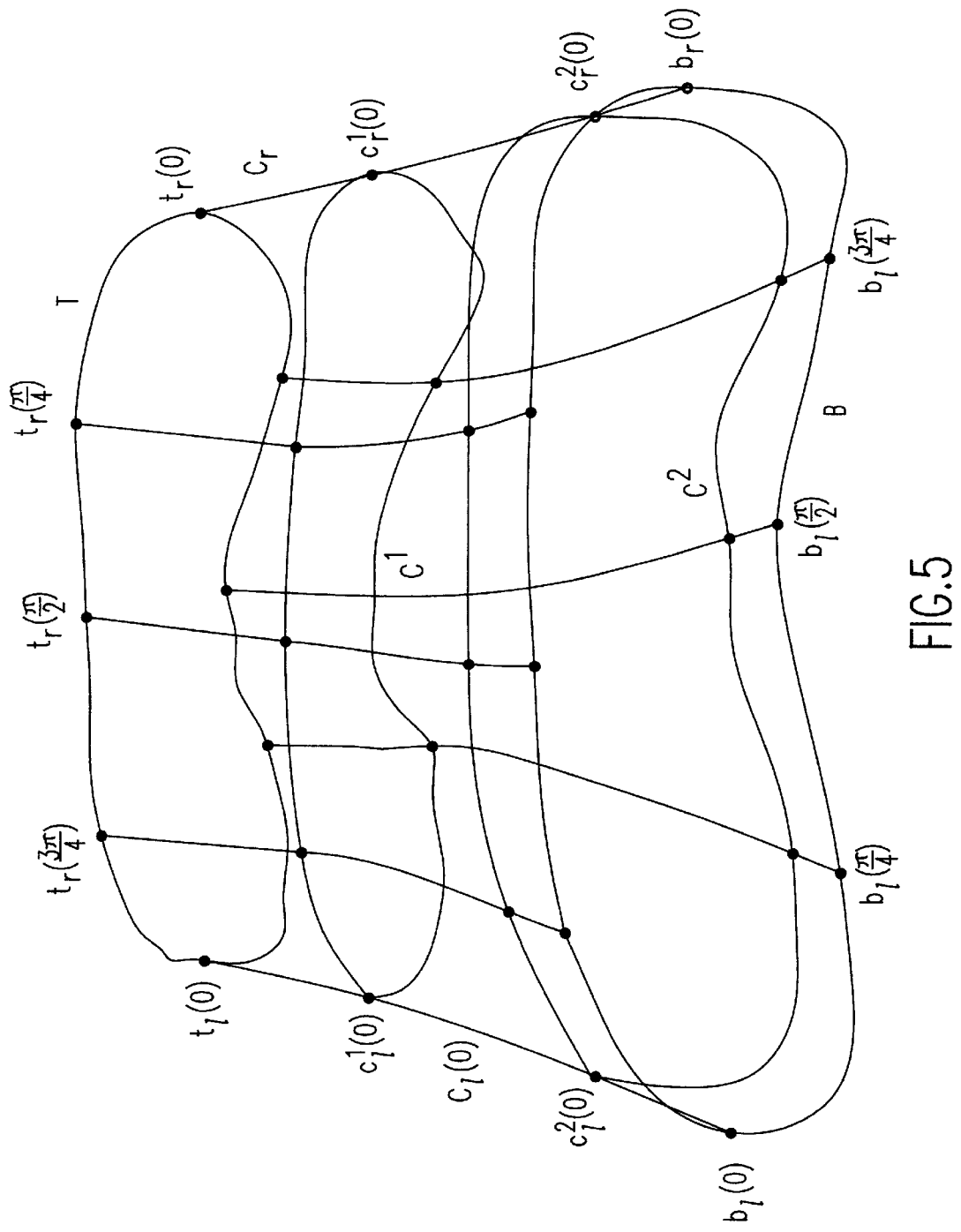
FIG. 5 is a wire frame representation of a vertebral body.

For each external curve which is determined, the points $t_l(\theta)$, $t_r(\theta)$ at the top of $C_l(\theta)$, $C_r(\theta)$ respectively and the points $b_l(\theta)$, $b_r(\theta)$ at the bottom can also be determined. A curve T can be interpolated through the at least five points a the top, and a curve B can be interpolated through the at least five points at the bottom. From the curves T, B and the at least five external curves of type $C_l(\theta)$ or $C_r(\theta)$, we obtain a wire frame diagram as seen in FIG. 5. A surface can be interpolated through all these points and all these curves, which represents closely a real vertebral body and how is lies in space; this surface can be rendered in a visualization tool.

We represent all twenty-four vertebrae, the deformed ones from the many cuts and the transitional ones as described above, to get a three-dimensional simplified model of the whole spine as it appears in space. In the visualization tool, any view can be selected for study by the physician.

Figure 6:
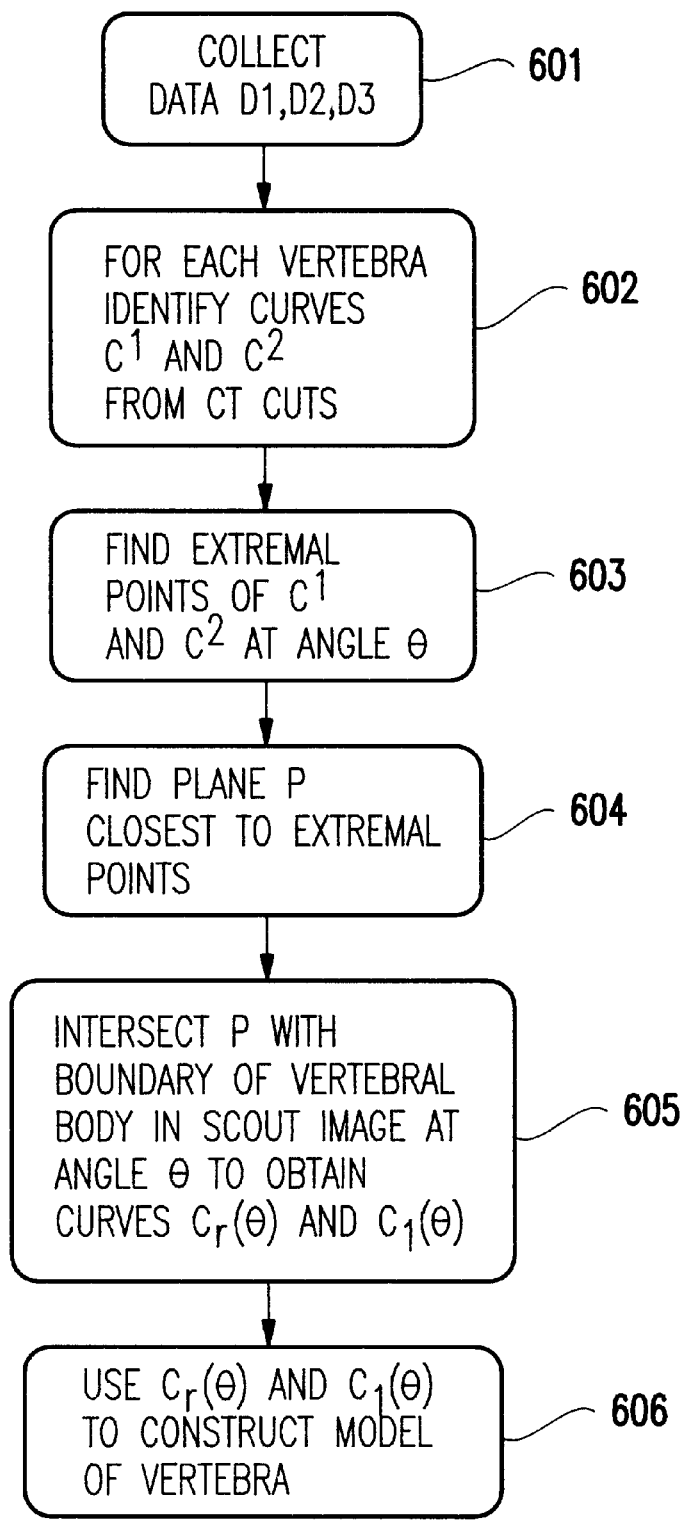
FIG. 6 is a flow chart showing the computer-implemented method according to a preferred embodiment of the invention.

FIG. 6 is a flow chart showing the steps of the geometric modeling following complete examination. In function block 601, data D1, D2 and D3 are collected. For each vertebra, the curves $C_1$ and $C_2$ (see FIG. 5) are identified from CT cuts in function block 602. In function block 603, the extremal points of curves $C_1$ and $C_2$ traversely to the direction at angle $\theta$ are found. Next, in function block 604, the plane P closest to the extremal points is found. The plane P is intersected with the boundary of the vertebral body in the scout image at angle $\theta$ to obtain curves $C_r(\theta)$ and $C_l(\theta)$ in function block 605. Finally, in function block 606, curves $C_r(\theta)$ and $C_l(\theta)$ for the four values of $\theta$ are used to construct a model of the vertebra.

Figure 7:
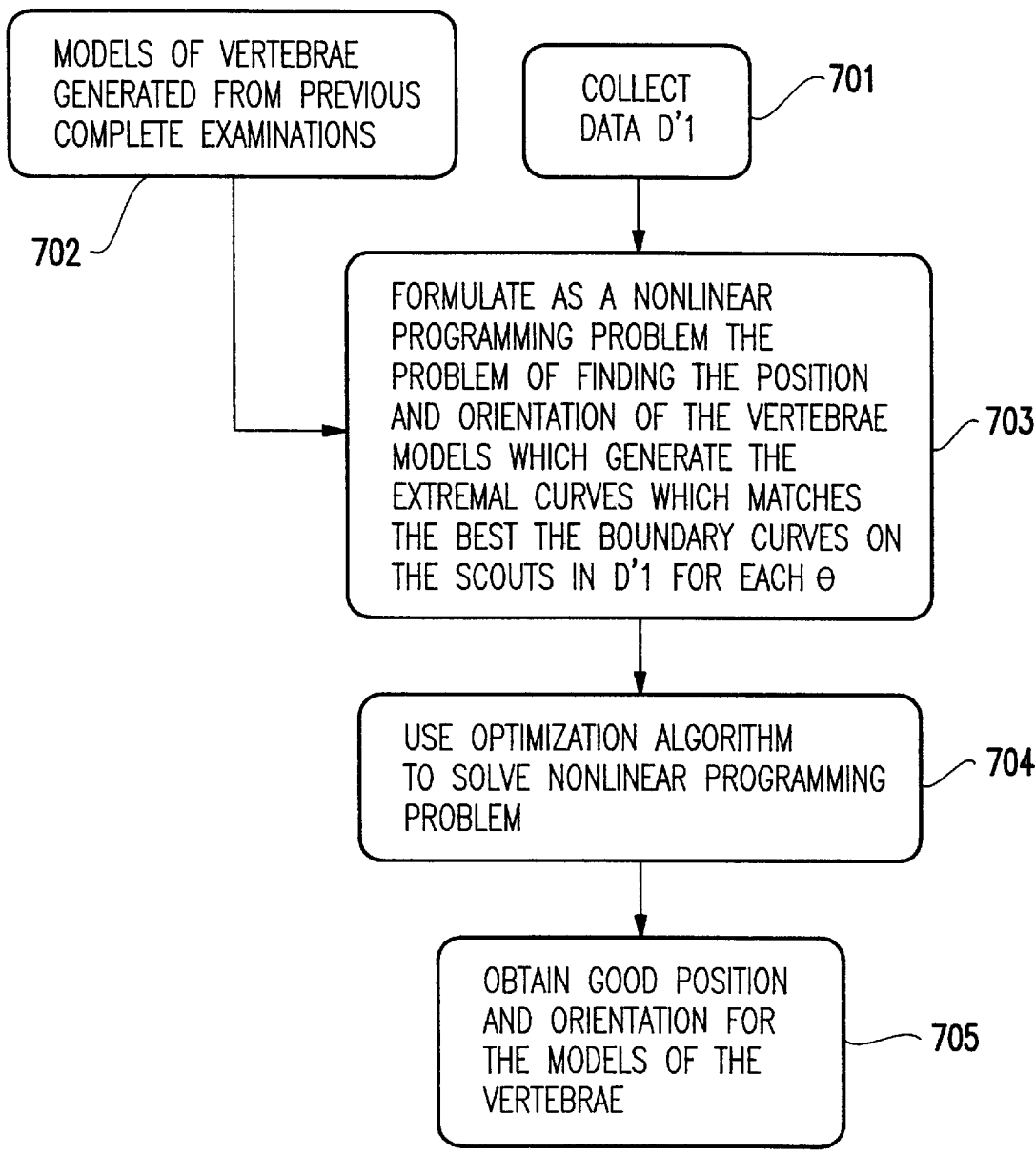
FIG. 7 is a flow chart showing the computer-implemented method according to a preferred embodiment of the invention.

FIG. 7 is a flow chart showing the steps of the geometric modeling following an intermediate examination. In function block 701, data D'1 is collected. In function block 703, the problem of finding the position and orientation of the models of vertebrae generated from previous complete examinations (function block 702, see also FIG. 6) which matches the best boundary curves of the scouts in D'1 is reformulated as a nonlinear programming problem. Best matching means that for each of the four values of $\theta$, the models generate extremal curves traversely to the direction with angle $\theta$ which matches the best with the boundary curves observed in the scouts D'1 with angle $\theta$. This nonlinear programming problem is then solved in function block 704 by any one of well-known optimization algorithms for nonlinear programming. The solution to this optimization will give us a new position and orientation for the models of vertebrae.

Geometric Modeling Following Intermediate Examinations

Once the three-dimensional models for each individual have been obtained following a complete examination, they can be used to exploit the limited data from intermediate examination to get three-dimensional pictures of the spine. One assumes that the intrinsic geometry of each individual vertebra has remained unchanged since the last complete examination and one just fit the position of that shape which would yield boundary curves on the scouts closest to the one obtained in D'1. This part of the procedure is much simpler and can be simply implemented by anybody versed in the arts of geometric modeling and medical imaging.

Bending: Besides examinations in rest position, one or two examinations also have to be performed in bending position, specially before surgery. Whenever CT scan machines where the bending can be performed are available, a scout will be the preferred solution. Otherwise, one would digitize standard X-rays. In all cases, one proceed with bending data as in the case of intermediate examinations since the individual vertebrae, which do not deform in bending maneuvers, are determined from the rest position examinations.

Radiation doses estimations: Recall that typical units of irradiation, such as the Rad which will be used in the discussion to come just to fix the ideas, tell us about the amount of radiation per unit of mass of leaving tissue. Accordingly, there are typically two concerns: one should minimize both the maximal amount of Rads affecting any part of the body and the quantity obtained by integrating the amount of Rads received locally across the whole irradiated part of the body. Technically, this amount to say that we want to keep both the $L^{28}$ and the $L_1$ norms of the irradiation as measured in Rads as small as possible.

We first concentrate on the examinations in the anatomical position, and will comment on bending afterward. Recall now that traditional examinations of scoliotic patients involves both postro-anterior and lateral X-rays, totaling about 0.5 Rad on some parts of the skin, and a depth dependent body irradiation which has to be integrated on the whole torso of the patient and beyond (from the base of the skull to the pelvis including the hip joints).

In the CT examination, one gets a maximal irradiation of about 2.2 Rads on the skin and about 1.4 Rads in the body center, but only at the level of the deformed vertebrae. The corresponding local irradiation dose has to be integrated on the horizontal slices of the body containing these vertebrae. One also has about 30% less than just stated for each slice of the intermediate vertebrae which has to be integrated on less than 60 horizontal slices of the body, each about one millimeter thick. The scouts are comparatively negligaeble.

Accordingly, the maximal irradiation is about 4.4 more for the complete examinations in our procedure, than in a traditional examination, which is essentially compensated by the fact that only eight such examinations are to be performed out of the total of thirty-five: the intermediate examinations only consist of CT scouts and can be neglected at the level of precision we have. On the other hand, as far as integrated radiations are concerned, our procedure is better than the classical method. Altogether, the resulting risk factor, which is clearly the only relevant parameter in comparing two methods, is expected to not be worse for our method than for the traditional one (even before one takes into account the fact that our method yields far less radiations than the classical one for the bending examinations).

Thus, with a risk factor which is, at worse, of the same order of magnitude, the method disclosed here gives far better diagnostic tools than traditional method. In fact, one can expect that this improved examination will eventually lead to less examinations, which would reduce further the risk factor.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer-implemented method of three-dimensional modeling of objects comprising the steps of:

collecting a limited amount of two-dimensional data of an object and collecting a limited amount of three-dimensional data of the object, where the amount of two-dimensional data alone and the amount of three-dimensional data alone are not sufficient to give a good three-dimensional reconstruction; and combining the collected small amount of two-dimensional data and the collected small amount of three-dimensional data to generate a three-dimensional model of the object.

2. The computer-implemented method in claim 1 used for three-dimensional reconstruction of the vertebral bodies of the spine by using computer tomography (CT) scans as the limited amount of three-dimensional data of the object and CT scout scans as the limited amount of two-dimensional data, the CT scans and the CT scout scans obtained using a sustainable amount of radiation.

3. A computer system used to improve three-dimensional reconstruction of objects by utilizing two-dimensional data to complement three-dimensional data comprising:

a computer with a memory, a central processing unit (CPU), and a display monitor;

a data structure resident in said memory and containing a limited amount of two-dimensional data of an object, where the amount of two-dimensional data alone is not sufficient to give a good three-dimensional reconstruction;

a data structure resident in said memory and containing a limited amount of three-dimensional data of the object, where the amount of three-dimensional data alone is not sufficient to give a good three-dimensional reconstruction; and a process executed by the CPU, to construct a three-dimensional model of the object using the two-dimensional data and the three-dimensional data.

4. The computer system in claim 3 used for three-dimensional reconstruction of the vertebral bodies of the spine by using computer tomography (CT) scans as the limited amount of three-dimensional date of the object and CT scout scans as the limited amount of two-dimensional data, the CT scans and the CT scout scans obtained using a sustainable amount of radiation.

* * * * *